United States Patent
Breen et al.

(10) Patent No.: US 7,597,864 B2
(45) Date of Patent: Oct. 6, 2009

(54) CONTROL OF MERCURY AND OTHER ELEMENTAL METAL EMISSIONS USING REACTION STABILIZATION DEVICE

(75) Inventors: Bernard P. Breen, Pittsburgh, PA (US); Robert A. Schrecengost, Beaver, PA (US)

(73) Assignee: Breen Energy Solutions, Carnegie, PA (US)

( * ) Notice: Subject to any disclaimer, the term of this patent is extended or adjusted under 35 U.S.C. 154(b) by 804 days.

(21) Appl. No.: 10/892,920

(22) Filed: Jul. 16, 2004

(65) Prior Publication Data

US 2006/0011115 A1 Jan. 19, 2006

(51) Int. Cl.
*B01D 47/00* (2006.01)
*B01D 53/46* (2006.01)
*B01D 53/86* (2006.01)
*B01D 45/00* (2006.01)
*B01D 46/00* (2006.01)
*B01D 53/00* (2006.01)
*B01J 8/02* (2006.01)
*F23J 11/00* (2006.01)

(52) U.S. Cl. .......... 423/212; 423/210; 423/215.5; 423/213.2; 110/345

(58) Field of Classification Search .......... 423/210, 423/215.5, 219, 220, 240 R, 240 S, 213.2, 423/212; 110/203, 216, 345
See application file for complete search history.

(56) References Cited

U.S. PATENT DOCUMENTS 5,374,410 A * 12/1994 Grasselli et al. .......... 423/239.2
5,443,805 A * 8/1995 Beer et al. .......... 423/235
5,670,122 A 9/1997 Zamansky et al.
6,136,281 A * 10/2000 Meischen et al. .......... 423/210

(Continued)

FOREIGN PATENT DOCUMENTS

EP 0 860 197 A1 8/1998
WO WO 93/23147 11/1993

OTHER PUBLICATIONS

"Kinetic Modeling of Homogeneous Mercury Oxidation: The Importance of NO and H2O in Predicting Oxidation in Coal-Derived Systems,".

(Continued)

*Primary Examiner*—Jerry Lorengo
*Assistant Examiner*—Noah S Wiese
(74) *Attorney, Agent, or Firm*—Buchanan Ingersoll & Rooney PC

(57) ABSTRACT

Ammonia and optionally carbon monoxide are injected into the flue gas containing metals such as mercury in a manner so that there are sufficient amounts of these materials in the flue gas when the flue gas is at a temperature of from 900° F. to 1,450° F. to oxidize the metals within the flue gas. The oxidized metals are then attracted to particulates present in the flue gas. Oxidation is facilitated by a reaction zone stabilizer through which the flue gas flows. The stabilizer provides a stable continuous ignition front. These particulates bound with oxidized metals are removed from the flue gas by a particulate removal device such as an electrostatic precipitator or baghouse. After the ammonia is injected, the flue gas can be rapidly cooled to a temperature below 500° F. to minimize decomposition of oxidized metals in the flue gas.

21 Claims, 8 Drawing Sheets

U.S. PATENT DOCUMENTS

| | | | |
|---|---|---|---|
| 6,146,605 | A | 11/2000 | Spokoyny |
| 6,258,336 | B1 | 7/2001 | Breen et al. |
| 6,357,367 | B1 | 3/2002 | Breen et al. |
| 6,375,909 | B1 * | 4/2002 | Dangtran et al. ............ 423/235 |
| 6,913,737 | B2 * | 7/2005 | Honjo et al. ................ 423/210 |
| 2003/0147793 | A1 * | 8/2003 | Breen et al. ................ 423/210 |

OTHER PUBLICATIONS

S. Niksa, Joseph J. Helble and N. Fugiwara, Environmental Science and Technology, 2001.

"Chemical Reactions of Mercury in Combustion Flue Gases," Hall, et al. Water, Air and Soil Pollution, vol. 56, 1991, pp. 3-14.

* cited by examiner

Temperature (°F) Leaving Convective
Economizer or Entering ESP

CONTROL OF MERCURY AND OTHER ELEMENTAL METAL EMISSIONS USING REACTION STABILIZATION DEVICE

FIELD OF INVENTION

The invention relates to a method for removing mercury and other elemental metals from emissions from combustion devices.

BACKGROUND OF THE INVENTION

Much work has been done to remove pollutants from emissions from coal fired furnaces. The focus of most of these efforts has been toward the removal of particulates, $NO_x$ and $SO_x$ from flue gas. Commercially available techniques for reducing nitrogen oxide emissions in furnace flue gases include low-$NO_x$ burners, overfire air, selective non-catalytic $NO_x$ reduction (SNCR), selective catalytic reduction (SCR), and reburning.

Reburning is a technique whereby a fraction of the total thermal input to the furnace is injected above the primary combustion zone to create a fuel rich zone. Hydrocarbon fuels such as coal, oil, or gas are more effective $NO_x$ reducers than non-carbon containing fuels such as hydrogen or non-hydrogen containing fuels such as carbon monoxide. Stoichiometry of about 0.90 (10% excess fuel) in the reburn zone is considered optimum for $NO_x$ control. Thus, it is apparent that the amount of reburn fuel required for effective $NO_x$ control is directly related to the stoichiometry of the primary combustion zone and, in particular, the amount of excess air therein. Under typical furnace conditions, a reburn fuel input of over 10% of the total fuel input to the furnace is usually sufficient to form a fuel-rich reburn zone. The reburn fuel is injected at high temperatures in order to promote reactions under the overall fuel-rich stoichiometry.

Typical flue gas temperatures at the injection point are above 1700 K (2600° F.). Overfire air is introduced into the flue gases downstream of the fuel-rich reburn zone in order to complete combustion of any unburned hydrocarbons and carbon monoxide (CO) remaining in the flue gases leaving the fuel-rich reburn zone. In addition, it is also known that rapid and complete dispersion of the reburn fuel in the flue gases is beneficial. Thus, the injection of reburn fuel is frequently accompanied by the injection of a carrier fluid, such as recirculated flue gases, for the purpose of promoting mixing. To the extent that the recirculated flue gas contains oxygen, the amount of reburn fuel must be increased.

U.S. Pat. No. 5,443,805 teaches injection of an additive such as ammonia with a small amount of hydrocarbon, preferably methane or natural gas, into flue gases at a temperature in the range of about 1228 K to 1422 K (1750° F. to 2100° F.), and preferably 1355 K to 1338 K (1800° F. to 1950° F.), for reducing pollutants such as $NO_x$ therein. Hydrocarbon is injected for the purpose of enhancing the $NO_x$ reduction efficiency of the ammonia additive in the temperature range of about 978 K to about 1422 K (1300° F. to 2100° F.). There is a similar teaching in U.S. Pat. No. 6,258,336. That patent also teaches that other nitrogenous compounds such as amines, urea, cyanuric acid and mixtures thereof can be injected with a hydrocarbon fuel downstream of the primary combustion zone.

While the art has focused primarily on the removal of $NO_x$ and $SO_x$ from flue gas, there are also concerns about emissions of mercury and other elemental metals such as chromium, arsenic and lead from combustion devices. Mercury (Hg), the eightieth element, is an important pollutant. As a vapor it is a poison of the nervous system. It is the dire consequences of chronic mercury poisoning which gave birth to the term "Mad as a hatter." Hatters that used mercury to block the hats were exposed to toxic levels of mercury vapor. The tremors, shakes, stutters, and stammers common to mercury poisoning were endemic in the trade. Neither were astronomers, who frequently used telescopes that were floated on mercury, immune from this disease. It was at times fatal and has the characteristic of being cumulative over years of exposure, as the body's nervous system has difficulty in purging this element. Most industrial uses of mercury today are carefully controlled. The biggest sources of environmental mercury are coal combustion and the combustion of municipal solid waste. Coal and especially municipal solid waste compositions may also result in emissions containing chromium, arsenic and lead.

Mercury vapor is a poison. At the levels common in the atmosphere the concentrations are usually safe. However, the mercury accumulates in lakes where it is further accumulated in fish. These fish, with organic mercury molecules in them, can be hazardous to individuals who eat them. Some states request that people eat fish from some lakes no more frequently that once a week. Often it is stated that pregnant women and small children should eat no such fish.

Several states and the United States Environmental Protection Agency will soon limit the emissions of mercury and possibly other elemental metals from combustion devices. A method for controlling emissions of mercury and other metals is needed. Some control is possible by using particulate collection devices. However, only very expensive baghouses (fabric filters) are efficient enough to reduce the mercury to levels that may be required and still it is possible for the elemental mercury vapor to escape as a gaseous vapor molecule.

Activated carbon and other fine particulates are used to absorb mercury. Special treatment of the activated carbon has been tested. Collection by the use of activated carbon is very expensive. So, it is seen that a new method of removing mercury from flue gas is needed.

SUMMARY OF THE INVENTION

Mercury is emitted in power plant flue gases because the elemental form has a relatively high vapor pressure at usual stack flue gas temperature conditions. As such, the elemental mercury is emitted as a vaporous gas, Hg(v), which is very difficult to separate or filter; whereas if the mercury is oxidized it is no longer an elemental vapor. Moreover, the oxidized form exhibits a much lower vapor pressure and tends to collect or adsorb into surfaces of flyash particles within the flue gas. Those flyash particles are largely collected before the stack gas escapes. We have found that mercury can be oxidized to mercury chloride in the presence of background chlorine gas or hydrochloric acid gas when ammonia or ammonia precursors are made available in the flue gas and when the temperature of the flue gas is in the range of 1005 K down to 755 K (1,350° F. down to 900° F.). When oxidized the mercury is absorbed by particulates in the flue gas and removed with the particulates.

Mercury does not oxidize to stable concentrations of mercury chloride at temperatures above 1061 K (1,450° F.), and oxidation may or may not occur within the temperature range 1005 K (1,350° F.) to 1061 K (1,450° F.) depending upon gas concentrations and moisture. At temperatures below 755 K (900° F.) the rate of oxidation effectively ceases. In this temperature range (1061 K down to 755 K), the rate of oxidation is increased by free chlorine radical (Cl) concentration, which becomes very limited in the presence of free hydrogen (H) radical concentration. The presence of increased water ($H_2O$) thus limits the concentration of free chlorine radical in this temperature range and thereby tends to increase elemental mercury emissions; whereas the presence of ammonia and CO tend to decrease the free hydrogen (H) concentration and thus improve the oxidation of mercury to mercury chloride by providing higher instantaneous levels of free radical Cl. The free hydrogen may also be decreased by the reaction or combustion of hydrocarbon vapors that also provide the CO concentrations thus limiting availability of reactive H radical concentrations.

We adjust ammonia concentrations, available in the temperature range of 1061 K (1,450° F.) down to 755 K (900° F.), to provide maximum oxidation of mercury to mercury chloride, in the presence of CO, hydrocarbons, and sometimes NO and varying amounts of water. In this way the emissions of elemental mercury can be essentially eliminated while at the same time ammonia injection can be used for selective non-catalytic reduction (SNCR) of nitric oxide. Alternatively, ammonia can be injected independently in the zone of the furnace where the flue gas is at temperatures in the range of 1061 K (1,450° F.) to 755 K (900° F.) for elemental mercury emission control. Ammonia injected at this temperature range may also compliment the operation of selective catalytic reduction (SCR) or various hybrid NOx removal systems although this temperature injection range is higher than normally used for SCR injection. Ammonia injection used at this temperature range also causes the oxidation of other elemental metals such as arsenic and lead that both poison the SCR catalyst and are themselves hazardous stack gas emissions.

At temperatures below 755 K (900° F.), mercury chloride will revert to equilibrium. That state does not prefer mercury chloride to exist in this lower temperature range. Yet, once flue gas leaves the 1061 K (1,450° F.) to 755 K (900° F.) range in the furnace it is directed through an economizer where the flue gas is cooled to temperatures below 755 K (900° F.). Consequently, whatever mercury chloride has been formed by the injection of ammonia as here described can decompose during cooling. However, we have found that such decomposition does not occur, or at least is minimized, if the flue gas is cooled rapidly. Such rapid cooling should be a drop in temperature of at least 500° C. (932° F.) per second. Thus, by imposing properly designed temperature gradients as taught herein, the reactive species are quickly brought to lower temperatures where the formation of $HgCl_2$ is favored, both by thermodynamics and in the chemical reaction kinetics of its formation.

We have also discovered that the oxidation of mercury and other metals can be improved by placement of a metal or ceramic honeycomb structure or similar reaction zone stabilizer in the furnace so that flue gas at temperatures between 1061 K to 755 K (1,450° F. to 900° F.) passes through the structure. This structure is used in combination with injectors that inject ammonia or an ammonia precursor and/or natural gas or other fuel into the flue gas before the gas reaches the reaction zone stabilizer. In the case where the flue gas already contains ammonia or an ammonia precursor and/or fuel species such as CO, hydrogen or other combustibles, then such injection is not necessary and the reaction zone stabilizer operates to stabilize the reaction and reduction of these gases.

The reaction zone stabilizer may be comprised of a metal structure spanning the width of the flue gas flow area. The reaction zone stabilizer has a plurality of evenly spaced apertures, with the flue gases flowing through the square or rectangular apertures of the grid. The apertures are of sufficient size to ensure that there is a low pressure drop across the reaction zone stabilizer.

The reaction zone stabilizer allows elemental mercury to reach the equilibrium concentration of mercury chloride at this temperature and results in high conversion of elemental mercury to mercury chloride. The reaction zone stabilizer works by using the heat of reaction contained in the residual CO in the flue gas to thermally initiate the production of free radicals. The gases react at the reaction zone stabilizer from the heat of reaction concentrated at the reaction zone stabilizer and conducted back to the flue gas as it enters the reaction zone stabilizer. It accomplishes this by finely mixing the flue gases from the main furnace, elevating the flue gas temperature and allowing equilibration of $NO_x$ and CO at lower temperatures than is usually possible.

Alternatively, the reaction zone stabilizer may comprise a ceramic structure spanning the width of the flue gas flow area. The ceramic may be of a honeycomb structure that has a plurality of evenly-spaced apertures, with the flue gases flowing through the hexagonal apertures of the honeycomb. Alternatively, the apertures may be circular, oval, triangular, square, rectangular, trapezoidal, pentagonal, heptagonal, octagonal, nonagonal, decagonal, or other appropriate geometric shape. The apertures are of sufficient size to ensure that there is a low pressure drop across the reaction zone stabilizer. The ceramic may be composed of an alumina silicate support structure. Alternatively, the ceramic may be composed of an alumina, silica, zirconium oxide, silicon carbide, copper oxide and all oxides of copper, iron oxide and all oxides of iron, copper sulfate, iron sulfate, magnesium oxide, zirconium phosphate, boron nitride or aluminum nitride support structure. The support structure may be formed by extrusion, casting or machining of the ceramic material.

The reaction zone stabilizer structure may include active sites of catalytic species that will collect chlorine effectively and provide a catalytic surface for the mercury oxidation reaction. The active sites may be composed of a carbon-containing material such as zeolite or SiC. Alternatively, the active sites may be composed of calcium-based materials. The active sites may be contained in a coating of the entire ceramic support structure. Alternatively, the active sites may be incorporated into the ceramic composition of the support structure itself.

Flyash collecting on the surface of the reaction zone stabilizer may include active sites of species that will collect chlorine effectively and provide a catalytic surface for the mercury oxidation reaction. These active sites may be comprised of unburned carbon contained in the fly ash. Alternatively, these active sites may be comprised of calcium compounds contained in the fly ash.

We adjust ammonia concentrations, available in the temperature range of 1061 K (1,450°) down to 775 K (900°), to provide maximum oxidation of mercury to mercury chloride, in the presence of CO, hydrocarbons, and sometimes NO and varying amounts of water. In this way the emissions of elemental mercury can be essentially eliminated while at the same time ammonia and/or natural gas injection can be used to continue Selective Non-Catalytic Reduction (SNCR) and/or fuel lean reburn into low temperature regions of greatly reduced levels of nitric oxide. Alternatively, ammonia can be injected independently in the zone of the furnace where the flue gas is at temperatures in the range of 1061 K (1,450°) to 755 K (900°) for elemental mercury emission control. Ammonia injected at this temperature range may also compliment the operation of SRC or various hybrid $NO_x$ removal systems, although this temperature injection range is higher than normally used for SCR reagent injection. Ammonia injection used at this temperature range also causes the oxidation of other elemental metals such as arsenic and lead that both poison the SCR catalyst and are themselves hazardous stack gas emissions.

DESCRIPTION OF THE PREFERRED EMBODIMENTS

To explain the present process it is first necessary to provide some background information about mercury (Hg). Mercury is a metal that melts at 234 K (−38° F.) and boils at 630 K (674° F.). As such it can be expected to have a high vapor pressure, relative to many metals. If fact, as experienced by the hatters, the vapor pressure of mercury is sufficient to poison people who are subject to prolonged exposure. However, the oxidized forms $Hg^+$ and $Hg^{++}$, which are usually present as HgO, $HgCl_2$ or HgCl, have much lower vapor pressure. Thus, it is much easier to collect the oxidized forms that are attached to particulates with the usual particulate collecting devices than it is to collect elemental mercury (Hg) which can be in its vapor or gaseous form at flue gas temperatures.

We provide a method to control the emissions of mercury (Hg) from combustion processes. It will control the emissions of mercury by promoting the oxidization of mercury to $Hg^{++}$ or to $Hg^+$. The oxidized mercury has a much lower vapor pressure than the elemental mercury and is readily collected with the flyash. Much of the oxidized mercury is immediately absorbed by the flyash. Electrostatic precipitators, fabric filters, scrubbers or other devices then collect the flyash. However, fabric filters, or baghouses as they are often known, will collect more of the flyash and thereby collect more of the mercury. Also this mercury oxidation process can be used with various sorbents.

In the present process we are oxidizing mercury with chlorine to $HgCl_2$, HgCl, HgO and other species, but we believe that the $HgCl_2$ is the predominate oxidized specie. We believe that HCl is the oxidizer and that the path is through atomic chlorine (Cl). The Cl concentration is dependent upon the HCl concentration, the OH concentration, and the temperature as well as several other species. The reaction pathway to mercuric chloride is said by Slinger to be:

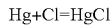

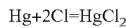

The chlorine comes from chlorides in the coal. All coal contains some chlorine but the concentration may be from 0.05 to 1.0% in UK coals. U.S. coals have lower chlorine content and are usually less than 0.3%. Powder River Basin coals typically have chlorine concentrations of 0.03%. We have observed that the mercury emissions will decrease with increasing chlorine in the coal. However, chlorine is so corrosive to metals that it would seldom be added to a combustion system for controlling mercury emissions. Some boiler operators may add sodium chloride to boilers to improve hot side electrostatic precipitator performance. However, this is seldom the practice and most operators would prefer to fire low chlorine coal.

Figure 1:
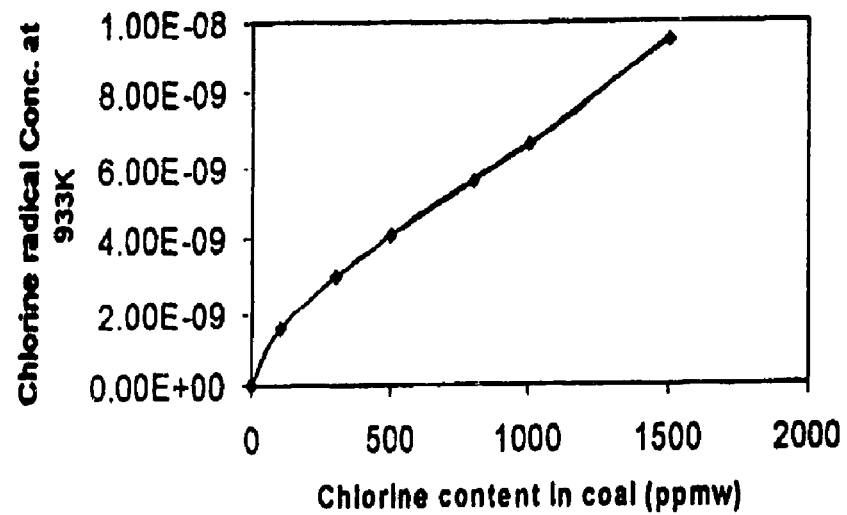
FIG. 1 is a graph showing the effect of the chlorine content in coal upon the concentration of chlorine radicals at a temperature of 933 K (1220° F.).

To calculate the species concentrations at various temperatures we have used the CHEMKIN36 software library and a detailed kinetic mechanism for coal combustion flue gas reactions, comprised of 51 species and 289 reaction steps. The calculation of the concentration of Cl as a function of chlorine in the coal is shown in FIG. 1. This is for a flue gas experiencing the usual cooling path for flue gas passing through a boiler and having the typical gas concentrations. This is the Cl concentration at 933 K (1220° F.), which is near the upper temperature where $HgCl_2$ will form.

Figure 2:
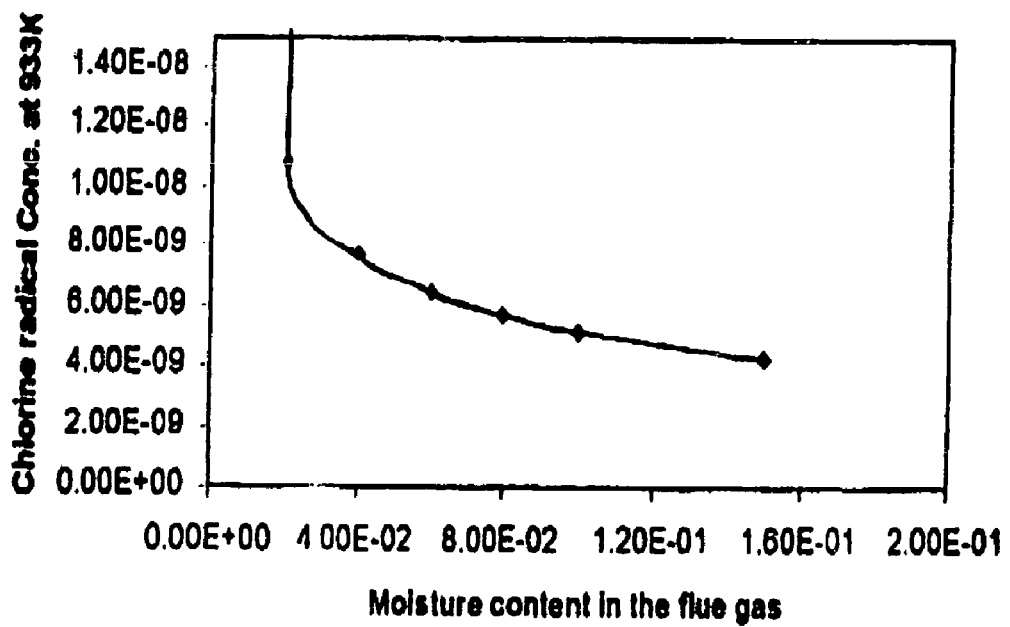
FIG. 2 is a graph showing the effect of the moisture content in flue gas upon the concentration of chlorine radicals at a temperature of 933 K (1220° F.).

FIG. 1 was calculated for a flue gas containing 14.44% $CO_2$, 5.69% water vapor, 3.86% $O_2$ and 75.69% $N_2$. This water vapor content is rather low and often flue gas might run 6-13% $H_2O$. Increasing water vapor has been calculated to suppress the formation of Cl. FIG. 2 shows the Cl concentration as a function of water vapor in the flue gas containing 14.44% $CO_2$, 3.86% $O_2$, varying amounts of nitrogen and 62 pm HCl. The Cl increases very rapidly as the water vapor falls below 2%. However, this level of water in flue gas is not readily attainable. In utility boiler operation it is not practical to control the concentration of water vapor.

We have now seen that for control of mercury emissions it is desirable to have high concentrations of chlorides in the coal and low concentrations of water vapor in the flue gas. We also know that it is not practical to control either one of these. There are two other species which can be controlled in the range of interest and which decrease emissions of Hg as they are increased in a limited range. They are ammonia ($NH_3$) and carbon monoxide (CO) and they both affect the Cl concentration in the temperature range of 933 K where $HgCl_2$ will form. Also Hg emissions are decreased as nitric oxide (NO) concentrations are decreased. In the range of interest it is possible to decrease NO concentrations. The increases in the active specie, Cl, through the control of $NH_3$ and CO concentrations are significant.

Figure 3:
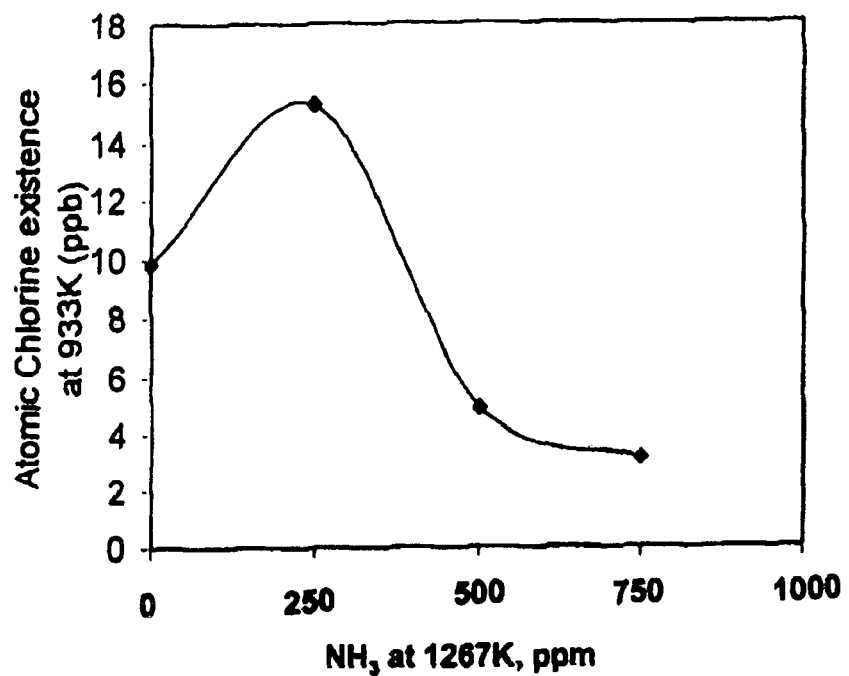
FIG. 3 is a graph showing the effect of the ammonia injection into flue gas at 1267 K (1821° F.) upon concentration of chlorine when that flue gas reaches a temperature of 933 K (1220° F.).

Ammonia in limited amounts can increase the concentration of Cl in the flue gas. The temperature for oxidation of Hg to HgCl is 933 K (1220° F.) down to 755 K (900° F.). However, Cl that is formed or available below this temperature reacts with HgCl to form $HgCl_2$. From HCl and OH the Cl is formed. The concentration of Cl rapidly converts back to HCl or to $Cl_2$, so the use of the Cl needs to be rapid, or the flue gas needs to be rapidly cooled at a rate greater than 1000° F. per second so that the Cl persists into the temperature window where $HgCl_2$ equilibrium is favored. FIG. 3 shows the Cl concentration at 933 K (1220° F.) when various amounts of $NH_3$ were added at 1267 K (1821° F.) and the gas followed the same boiler cooling time history as in a typical boiler. This is for a typical flue gas of 2.5% $O_2$, 8.4% $CO_2$, 6.7% $H_2O$, 500 ppm $NH_3$ and most of the remainder $N_2$. This figure shows that the ammonia can increase the Cl concentration by 50%. However, this is accomplished by adding only 250 ppm of $NH_3$ to gas that has 500 ppm NO. This ammonia addition at 1267 K (1821° F.) is typical of selective non-catalytic $NO_x$ control (SNCR). However, for good $NO_x$ control the ammonia is added at a molar ratio of about 1:1 with the NO. When urea is used for SNCR it is added at about half that ratio but since there are two $NH_2$ fragments in each urea molecule the effective $NH_3$ is the same. At molar ratios of $NH_3$ to NO of 1:1 the Cl concentration at 933 K is reduced by 50%. We need a ratio of only 0.5:1 of $NH_3$ or urea to NO which is less that the 1:1 required for NO emissions control by SNCR. We also need the $NH_3$ to persist, as ammonia slip, into the lower temperature region (933 K) where the $HgCl_2$ begins to form. We can use ammonia that is slip from an SNCR process. We can generate more ammonia slip by introducing the ammonia at a slightly lower temperature. Ammonia can be added at around 933 K (1220° F.) or slightly higher in amounts much lower than are required for SNCR. Since little of this ammonia will react at this temperature, not much is needed.

When a selective catalytic $NO_x$ reduction process is used (SCR) the process operates at about 644 K to 700 K (700° F. to 800° F.) and the temperature is a bit too low for the oxidation of Hg. To control the Hg emissions, part or all of the ammonia is added at a temperature above the normal temperature for the addition of ammonia. Therefore, the Hg is oxidized through the assistance of part or all of the ammonia for the SCR process at temperatures of 933 K (1220° F.) and slightly higher.

Finally, $NO_x$ emissions are sometimes controlled by a combination of SCR and SNCR processes. The combination is known as a hybrid process. In this process much or all of the ammonia is added at about 1233 K (1750° F.) or slightly higher and the remainder is added just before the catalyst, which is at about 600 K to 700 K (620° F. to 800° F.). The ammonia that is added just before the catalyst is added at such a low temperature that it does not assist in the oxidation of Hg. However, the ammonia that is added at the high temperature and not immediately consumed does help. Too much ammonia at the reaction temperature (750 K-933 K) will retard the oxidation of Hg. Therefore, it is necessary to optimize the amount of ammonia added at the upper temperature as well as to find just the correct injection temperature.

Figure 4:
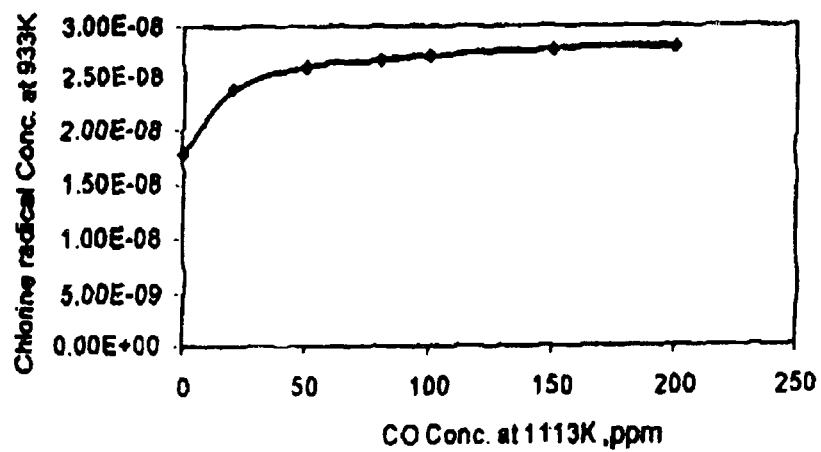
FIG. 4 is a graph showing the effect of the carbon monoxide concentration upon the concentration of chlorine radicals at a temperature of 933 K (1220° F.).

Carbon monoxide (CO) increases the Cl concentration and thus the Hg oxidation. FIG. 4 shows the Cl concentration by kinetic modeling found at 933 K (1220° F.) for a flue gas mixture with various CO concentrations beginning at 1113 K (1543° F.). Throughout the cooling of the flue gas, the CO is being oxidized to $CO_2$ so it is important to specify the concentration and the temperature. This is for a flue gas with 14.44% $CO_2$, 5.69% $H_2O$, 3.86% $O_2$, 62 ppm HCl, and 76.59% $N_2$. It can be seen that increasing the CO from zero to 50 ppm increases the Cl from 18 to 26 ppb or almost 50%.

Figure 5:
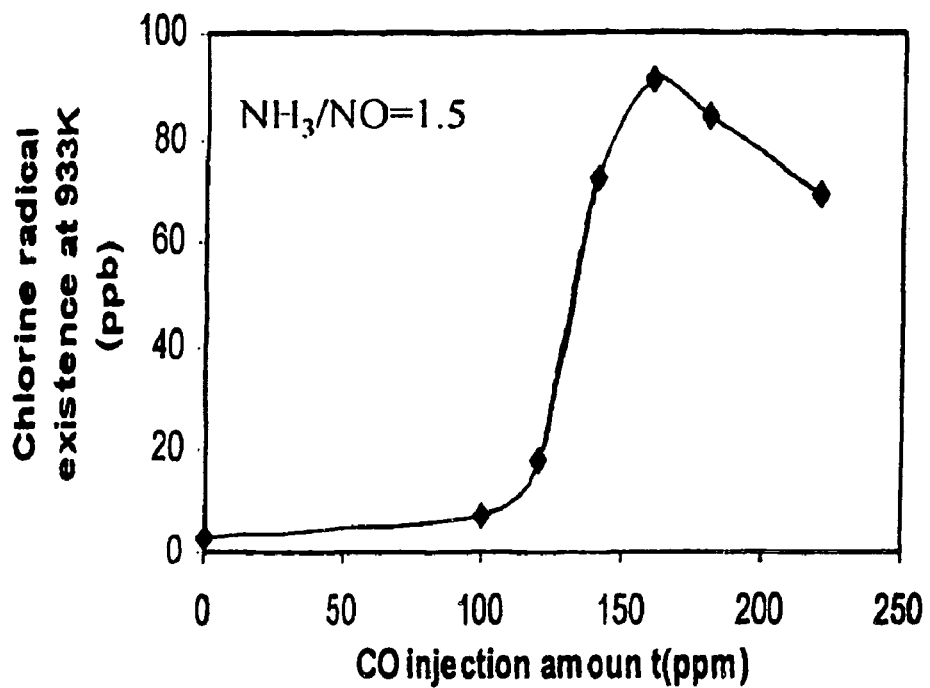
FIG. 5 is a graph showing the effect of carbon monoxide injection upon the concentration of chlorine radicals at a temperature of 933 K (1220° F.).

At a higher temperature more CO is required since the CO is being oxidized throughout the flue gas cooling process. FIG. 5 shows chlorine radical (Cl) concentration at 933 K (1220° F.) as a function of CO concentrations beginning at 1267 K (1821° F.). This is for a specific $NH_3$/NO injection rate of 1.5:1. Here, at about 160 ppm CO the Cl concentration is about 20 times as much as it is at zero CO. Thus, it is seen that $NH_3$ and CO are both important to the oxidation of Hg. Both are useful and they are synergistic.

CO is very common in boilers and even in the flue gas as it exits the stack. However, it oxidizes throughout the process as the gases are cooled by the convective heat exchangers. It is usually present at the stack only if: 1) there is insufficient $O_2$ to oxidize all of the fuel; 2) there are carbon particles which continue to oxidize to CO at bulk gas temperatures which are so low that the CO is only very slowly oxidized to $CO_2$; or, 3) the mixing is poor and gas streams or even eddies contain an excess of fuel that do not mix into the oxygen rich streams until the temperatures are well below 1200 K (1700° F.). In our case we would like a relatively even mixture of CO, so the addition of CO or the preservation of CO is important.

Figure 6:
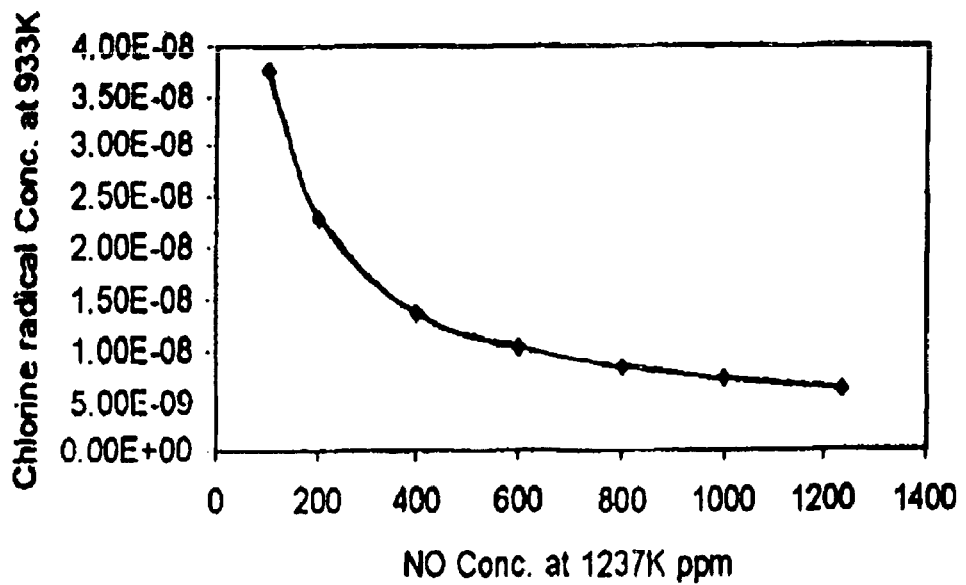
FIG. 6 is a graph showing the effect of the NO concentration upon the concentration of chlorine radicals at a temperature of 933 K (1220° F.).

The NO in the flue gas limits the formation of Cl. FIG. 6 shows the chlorine radical concentration as a function of NO in the flue gas containing 14.44% $CO_2$, 5.69% $H_2O$, 3.86 $O_2$, 76.59% $N_2$ and 62 ppm HCl. The Cl concentration is given at 933 K (1220° F.) and the NO concentration is given at 1237 K (1767° F.). This figure clearly shows the Cl concentration more than doubling as the NO concentration is reduced from 400 to 100 ppm.

Figure 7:
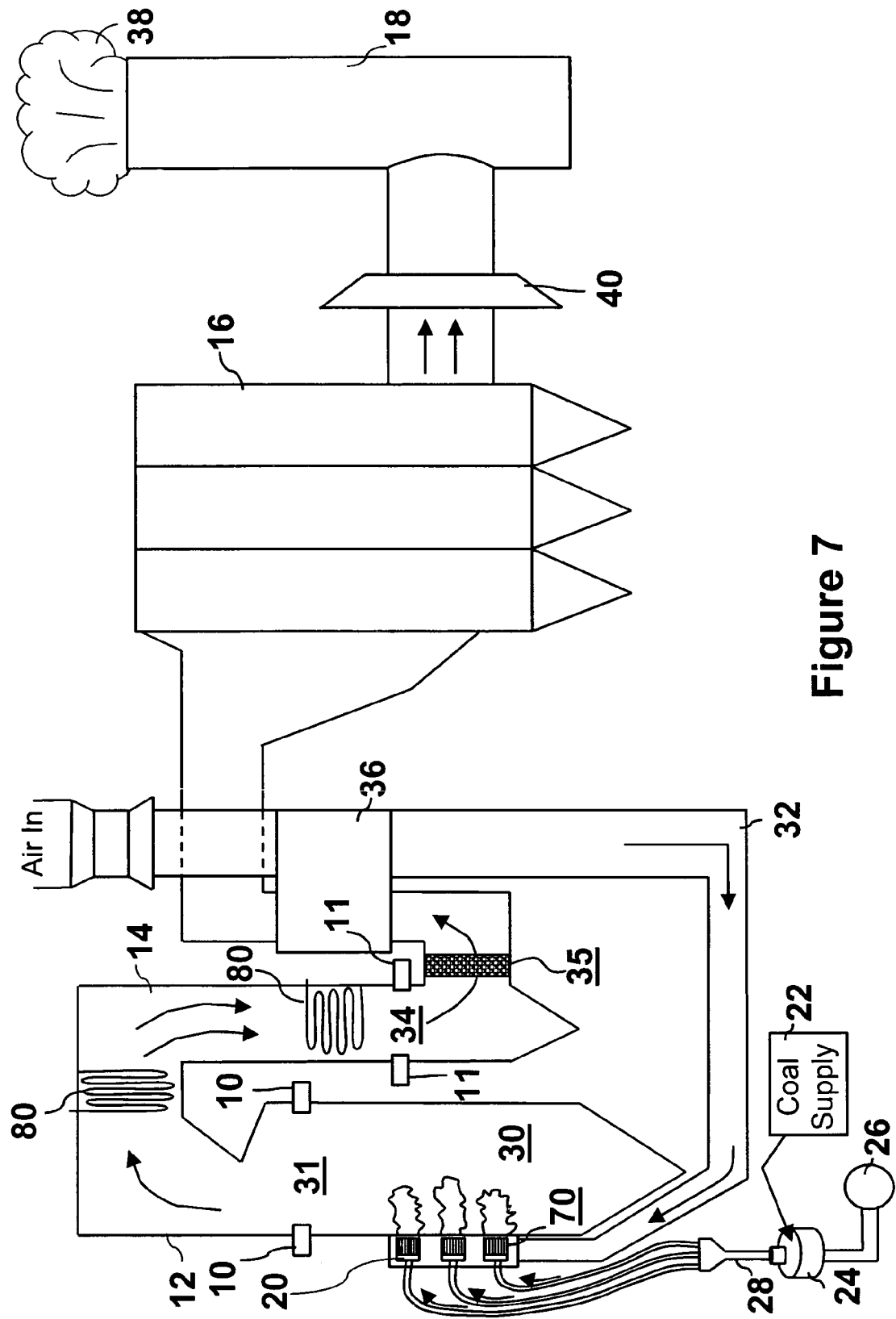
FIG. 7 is a diagram of a wall-fired furnace in which ammonia is injected and a reaction zone stabilizer is provided to control emissions of mercury and other elemental metals.

A conventional furnace, illustrated in FIG. 7, generally includes a boiler 12, an economizer 14, an electrostatic precipitator (ESP) 16 and a stack 18. The boiler 12 includes a plurality of burners 20 typically located on the front and/or rear walls of the boiler 12. For convenience, only three burners 20 are shown in FIG. 7.

Operation of the boiler 12 requires a supply of fuel to be burned, such as a coal supply 22. The coal supply 22 supplies coal at a predetermined rate to a pulverizer 24, which grinds the coal to a small size sufficient for burning. The pulverizer 24 receives a primary flow of air from a primary air source 26. Only one pulverizer 24 is shown, but many are required for a large boiler, and each pulverizer 24 may supply coal to many burners 20. A stream of primary air and coal is carried out of the pulverizer 24 through line 28. The primary stream of air and coal in line 28 is fed to the burner 20, which burns the fuel/air mixture in a combustion zone 30 in which the temperature exceeds 1700 K (2,600° F.).

To assist in the burning, the boiler 12 includes a secondary air duct 32 providing a secondary airflow through overfire air ports to the burner 20. Usually about 20% of the air required for optimum burning conditions is supplied by the primary air source 26. The secondary air duct 32 is used to provide the remaining air. The secondary air duct 32 brings the excess air in from the outside via a fan (not shown) and the air is heated with an air preheater 36 prior to providing the air to the burner 20.

While only three burners 20 are shown in FIG. 7, it should be understood that there are typically many more burners in a conventional furnace. Several burners may share a secondary air windbox and each burner usually has an adjustable secondary air register 70 to control the air flow to it. Each of the burners 20 burns its respective fuel/air mixture in the combustion zone 30 of the boiler 12. As the plurality of burners 20 burn their respective fuel/air mixtures in the combustion zone 30, a gaseous by-product is produced. The gaseous by-product flows in the direction of the arrows through various temperature zones out of the boiler 12, through the economizer 14, through the ESP 16 and into the stack 18 where it is exhausted to the atmosphere at 38. A fan 40 aids the flow of the gaseous by-product in this manner. The flue gas is also used to heat steam and water in convective passes 80, as is known in the art.

Some furnaces contain injectors 10 for supplying reburn fuel to the flue gas in a temperature zone 31 where temperatures may range from 1228 K to 1255 K (1750° F. to 2100° F.). When the flue gas reaches the inlet of the electrostatic precipitators 16 it will be at a temperature of about 450 K (350° F.). We want to have ammonia and carbon monoxide present in the temperature zone 34 where the flue gas is 755 K to 1061 K (900° F. to 1,450° F.). One way to accomplish this is to inject sufficient amounts of ammonia and possibly also inject carbon monoxide through the reburn fuel injectors 10 so that both will be present in temperature zone 34. One can also add carbon monoxide to the flue gas by biased firing of the burners, or otherwise adjusting the air to fuel ratio in the initial flames, to produce sufficient carbon monoxide so that enough carbon monoxide will be in the flue gas when the flue gas passes through the second temperature zone to oxidize mercury present in the flue gas. For some fuels such as coal, the size consistency of the fuel may also be changed to change the level of carbon monoxide in the flue gas. We can, however, provide injectors 11 positioned to inject ammonia and possibly carbon monoxide and hydrochloric acid into the flue gas when the flue gas is at the second temperature zone 34 where the temperature is 755 K to 1061 K (900° F. to 1,450° F.). The ammonia could be injected as urea or as any other ammonia-containing compound. If desired one could take a sample of the flue gas from the second temperature zone and measure an amount of carbon monoxide as well as an amount of ammonia present in the flue gas. This information could then be used to determine the amounts of these additives that should be injected into the second temperature zone to achieve a desired level of removal. We further provide a reaction zone stabilizer 35 in the furnace at a location where flue gas at a temperature from 1,450° F. to 900° F. passes through the structure 35.

The reaction zone stabilizer is placed perpendicular to the direction of the flue gas flow. In a large boiler this may be a honeycomb of ceramic material 1 foot thick by 10 feet high and 20 to 50 feet wide. The ceramic may contain alumina silicate, alumina, silica, silicon carbide, copper oxide and all oxides of copper, iron oxide and all oxides of iron, copper sulfate, iron sulfate, magnesium oxide, zirconium phosphate, boron nitride, aluminum nitride, zirconium oxide and mixtures thereof. This ceramic thickness provides a high temperature heat carry-back from the reaction zone it itself creates by both radiation and solid-material conduction from the heat of reaction back to the incoming flue gases, into which have been injected combustible gases. The stabilizer may also be metal or a ceramic and metal structure and could be configured like many burner flame stabilizers. The metal could be a carbon steel, copper, stainless steel or a copper containing alloy, or combinations of these alloys. The reaction zone stabilizer may contain active sites of species that will collect chlorine effectively and provide a surface for the mercury oxidation reaction and further oxidation of HgCl to the more stable $HgCl_2$ state. The sites may be carbon or carbon containing material such as zeolite, silicon carbide, calcium carbides, other metal carbides and mixtures thereof. The same injectors 11 preferably also inject natural gas, methane or another fuel to raise the temperature of the flue gas. That fuel may be hydrogen, petroleum products and compounds of the form $C_xH_y$ or $C_xH_yO_z$ and mixtures thereof.

Certain published data of boiler operations tends to confirm our conclusions that the presence of ammonia in the flue gas when the flue gas is at a temperature of from 755 K to 1005 K (900° F. to 1,350° F.) will reduce mercury emissions. It has been reported that the Becker #3 boiler in Minnesota has experienced mercury removal of less than 30% which is typical. This boiler has a wet/dry scrubber in which a water lime slurry is sprayed into the flue gas. In contrast, published data for the #3 boiler at Salem Harbor which is set forth in Table 1 below experienced a mercury removal of 82.42%. Although some have speculated that the higher removal rate at Salem Harbor #3 is attributable to Loss on Ignition we believe that the data supports our disclosure. When Loss on Ignition occurs a relatively high level of carbon particles pass through the burner into the flue gas. These particles can attract and entrap mercury and mercury compounds. Hence, it was theorized that the high mercury recovery was attributable to the presence of an unusually high content of carbon particles in the flue gas. The problem with this conclusion is that those conducting the study did not report that the burners were operating at low efficiency or that there was an unusually high particulate concentration in the flue gas. On the other hand the information that was reported supports our conclusion that mercury removal was higher because ammonia was present in the flue gas when the gas was at a temperature between 755 K to 1005 K (900° F. and 1350° F.) and carbon monoxide most likely was also present.

Salem Harbor Unit 3 is a pulverized coal, wall-fired boiler manufactured by Babcock & Wilcox which was installed in 1951. Nameplate generating capacity for Unit 3 is 165 MW. Unit 3 is equipped with 16 Riley Stoker low $NO_x$ burners. It is equipped with a selective non-catalytic reduction system utilizing a urea solution (1 gpm 50% urea to 18 gpm of city water) for post-combustion $NO_x$ reduction. Unit 3 fires low sulfur South American coal. The facility is equipped with a continuous emission monitoring system (CEMS). The CEMS measures and reports opacity, $CO_2$, $SO_2$, $NO_x$ and CO levels in the exhaust gas. The CEMS data is also used to control the injection rate of urea. Unit 3 is equipped with an electrostatic precipitator system for the control of particulate emissions. The precipitator was manufactured by Research-Cottrell. The flue gas from Unit 3 flows from the economizer outlet to the precipitator and then to the 445 foot tall exhaust stack.

During a test program, Unit 3 was operating at a "steady-state" load condition throughout each test run. The steady-state load represented the maximum capacity (±5%) of the source being tested. Measurements of particle bound mercury, oxidized mercury and elemental mercury were made at the inlet of the electrostatic precipitator (ESP) and at the exhaust stack or outlet of the ESP four times. The results of these measurements are set forth in Table 1. From these results removal efficiencies were also determined as reported in Table 1.

TABLE 1

MERCURY EMISSIONS DATA AND
REMOVAL EFFICIENCIES

| | Measured At ESP Inlet (in mg/hr) | | | | |
|---|---|---|---|---|---|
| Component | Test 1 | Test 2 | Test 3 | Test 4 | Average |
| Particle Bound Hg | 1,978 | 2,333 | 1,902 | 1,932 | 1,938 |
| Oxidized Hg | 156 | 78 | 22 | 29 | 69 |
| Elemental Hg | <308 | <392 | <148 | <151 | <202 |
| Total Hg | <2,442 | <2,713 | <2,072 | <2,112 | <2,209 |

TABLE 1-continued

MERCURY EMISSIONS DATA AND REMOVAL EFFICIENCIES

| | Measured at ESP Exhaust Stack | | | | |
|---|---|---|---|---|---|
| | Test 1 | Test 2 | Test 3 | Test 4 | Average |
| Particle Bound Hg | 32.07 | 41.33 | 48.79 | 37.44 | 39.43 |
| Oxidized Hg | 128.28 | 79.71 | 34.44 | 37.44 | 66.72 |
| Elemental Hg | <250.72 | <245.04 | <149.25 | <138.25 | <179.41 |
| Total Hg | <411.06 | <366.09 | <232.48 | <213.14 | <285.56 |

| | Inlet/Outlet Removal Efficiency % | | | | |
|---|---|---|---|---|---|
| Component | Test 1 | Test 2 | Test 3 | Test 4 | Average |
| Particle Bound Hg | 98.28 | 98.23 | 97.43 | 98.96 | 97.96 |
| Oxidized Hg | 17.68 | * | * | * | * |
| Elemental Hg | 18.56 | 18.92 | * | 8.39 | 8.62 |
| Total Hg | 83.17 | 86.51 | 88.78 | 89.71 | 87.28 |

* Increase observed.

The average removal efficiency of 87.28% is significant because the electrostatic precipitators removed most of the mercury passing through them. This occurred because most of the mercury was particle bound and the electrostatic precipitators removed nearly all the particles. Such binding could only have occurred if the mercury was oxidized. It therefore appears that the addition of urea provided sufficient ammonia within the temperature zone of 755 K to 1005 K (900° F. and 1350° F.) to allow such oxidation.

Figure 8:
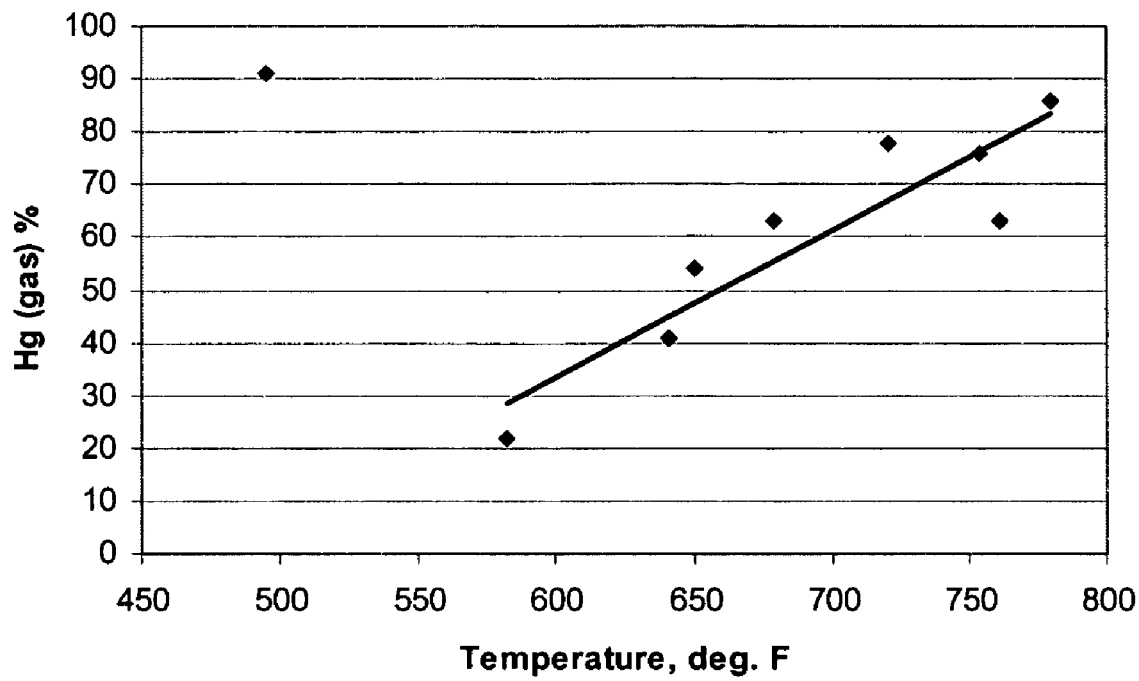
FIG. 8 is a graph of data reported by the United States Environmental Protection Agency of the percentage of mercury in vapor form in flue gas at various temperatures.

FIG. 8 presents data reported by the EPA concerning the amount of mercury in vapor form in flue gas at temperatures from 550° F. to 950° F. The graph shows that within this temperature range, and particularly at temperatures between 700° F. and 950° F., over half of the mercury present is in elemental vapor form. The data forms an S Curve, suggesting an almost direct relationship between temperature and the percentage of mercury present in elemental vapor form. Consequently, one can expect that if flue gas containing mercury chloride is within the temperature range from 700° F. to 950° F. that compound will decompose into elemental mercury vapor and chlorine.

Figure 9:
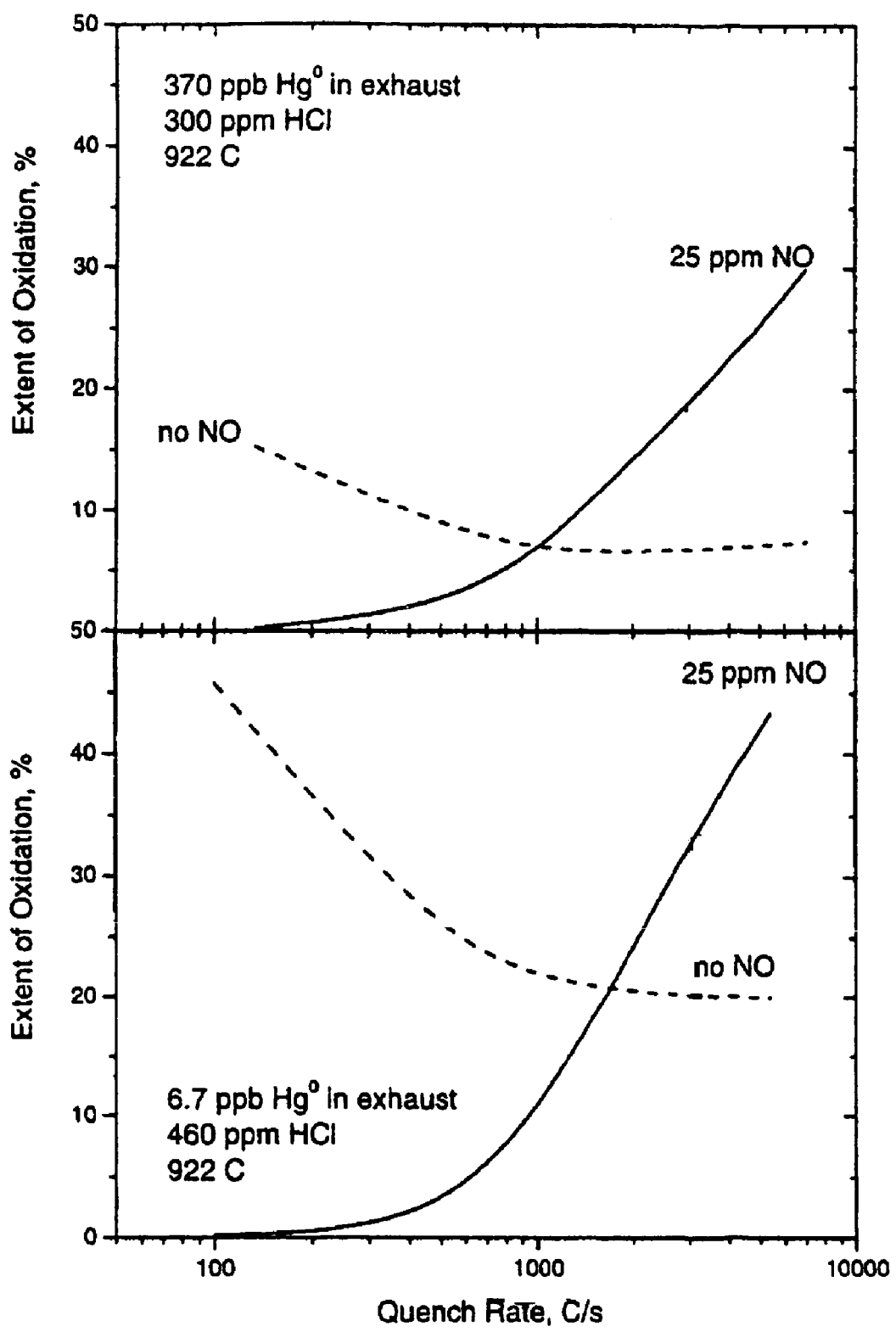
FIG. 9 is a graph showing the rate of mercury chloride oxidation at 922° C. for a range of quench rates from 100° C. to 7,000° C. per second for two gas samples.

FIG. 9 is a graph of data reported by Niksa et al. of the oxidation of mercury at various quench rates. See "Kinetic Modeling of Homogeneous Mercury Oxidation," S. Niksa, J. Helble and N. Fujiwara, *Environmental Science and Technology*, 2001. The graphs show that at cooling rates above about 500° C. per second (932° F. per second), the oxidation rates are higher. From this data we concluded that one could improve the amount of mercury capture from flue gas by not only forming mercury chloride in the 1005 K (1,350° F.) to 755 K (900° F.) temperature range, but also by rapidly cooling the flue gas from temperatures within that range to temperatures below 500° C. The improvement is graphically shown in FIG. 10.

Figure 10:
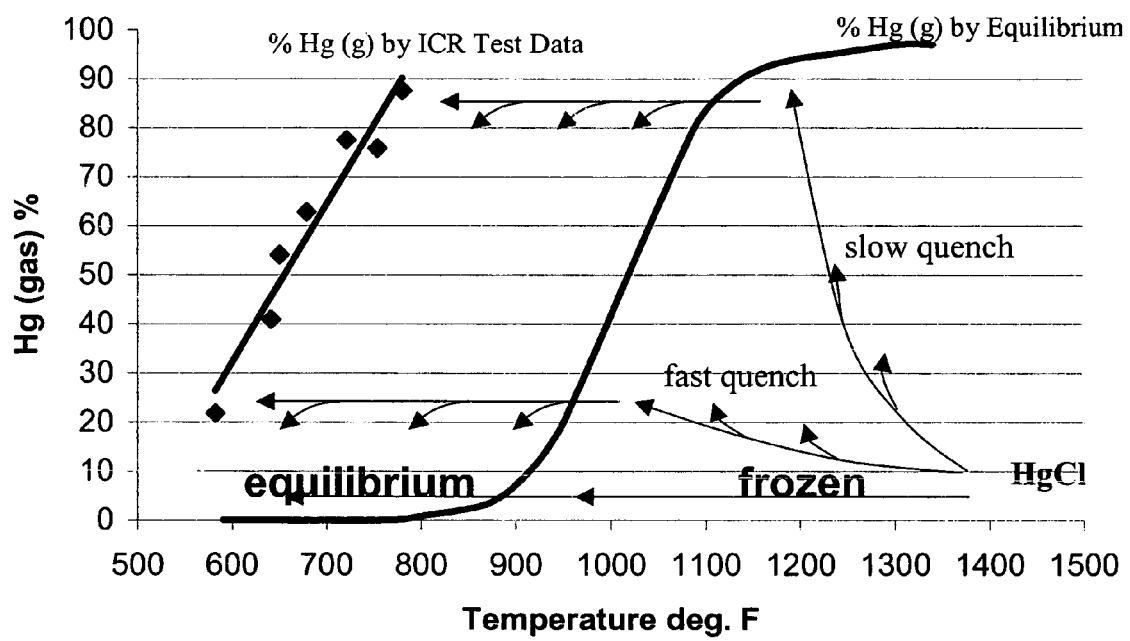
FIG. 10 is a graph showing mercury capture over a temperature range of from 600° F. to 1350° F.

Referring to FIG. 10 the initial conditions are that mercury chloride is present in the flue gas at a temperature of about 1350° F. (732° C.). Furthermore, only about 15% of the mercury in that flue gas is in elemental vapor form, the remainder being in the form of mercury chloride. If the flue gas is rapidly cooled as indicated by the "fast quench" arrows, then the mercury chloride is frozen and does not decompose to elemental mercury vapor. Cooling occurs so rapidly that there is no time for such decomposition. On the other hand, if the flue gas is cooled slowly, that "slow quench" will result in decomposition of the mercury chloride. That slow quench results in almost 90% of the mercury being in elemental vapor form. Since elemental mercury vapor is much more difficult to remove than mercury which has been oxidized to mercury chloride, a "fast quench" should be used.

The cooling rate of the flue gas as it passes through the economizer is dependent upon the tube configuration and other design aspects of the economizer. Some economizers currently in service can cool flue gas at rates greater than 3000° F. per second (1649° C. per second). Adding fins to the cooling tubes can usually increase the rate of cooling. Therefore, it should be possible to use the present method in many furnaces without modifying the furnace. If the economizer in an existing furnace has a slow cooling rate and a higher cooling rate is desired to achieve maximum mercury removal, it can be accomplished by adding fins to the economizer cooling tubes.

We have shown that the Cl that oxidizes the Hg is increased by more Cl in the coal, less water and less NO in the flue gas and by small amounts of $NH_3$ and CO in the flue gas. We have also shown that rapid cooling of the flue gas passing through the economizer can increase mercury removal. The cooling rate of the economizer, as well as the amount of NO, $NH_3$, and CO present in the flue gas, can be controlled. To maximize the amount of mercury oxidation, appropriate levels of $NH_3$ and/or CO can be added to the flue gas when the flue gas is in the temperature range of 1450° F. to 900° F. To maximize the amount of oxidized mercury that is removed, the flue gas can then be rapidly cooled to a temperature at below 900° F. at a cooling rate of at least 1000° F. per second, and preferably 1500° F. per second, after the addition of $NH_3$ and/or CO. In some applications the flue gas may be cooled to a temperature below 650° F. based upon the operational characteristics of the furnace.

Because Cl also oxidizes with other elemental metals a similar result could be expected for removal of many other metals such as chromium, arsenic, selenium, cadmium, and lead. Arsenic, selenium, cadmium, and lead are toxic and chromium six is toxic so it is desirable to limit the emissions of these metals and there compounds. Most of these metals are vaporized with iron from steel making electric furnaces. They are collected as oxides and resulting mix is a hazardous waste. To separate these, the materials are heated by a fuel-rich fire and all but the iron are vaporized as the elemental metals. The iron oxide is separated as a molten slag which is no longer toxic and then with the addition of more air the hot metals are oxidized and the less volatile oxides are collected by a baghouse or ESP as a valuable commodity. Thus, it is seen that these metals are less volatile when they are oxidized. Many of these metals are emitted from power plant stacks in proportions in excess of their proportions to iron, aluminum, silicon, sodium, and other metals in the coal. Therefore, these metals can well be expected to be more completely retained in the collected flyash when they can be further oxidized by the Cl that we are maximizing. Consequently, the process as described in the context of removing mercury is also useful for removing many other metals from flue gas. For removal of many of these metals, it may not be necessary to rapidly quench the flue gas temperature.

Figure 11:
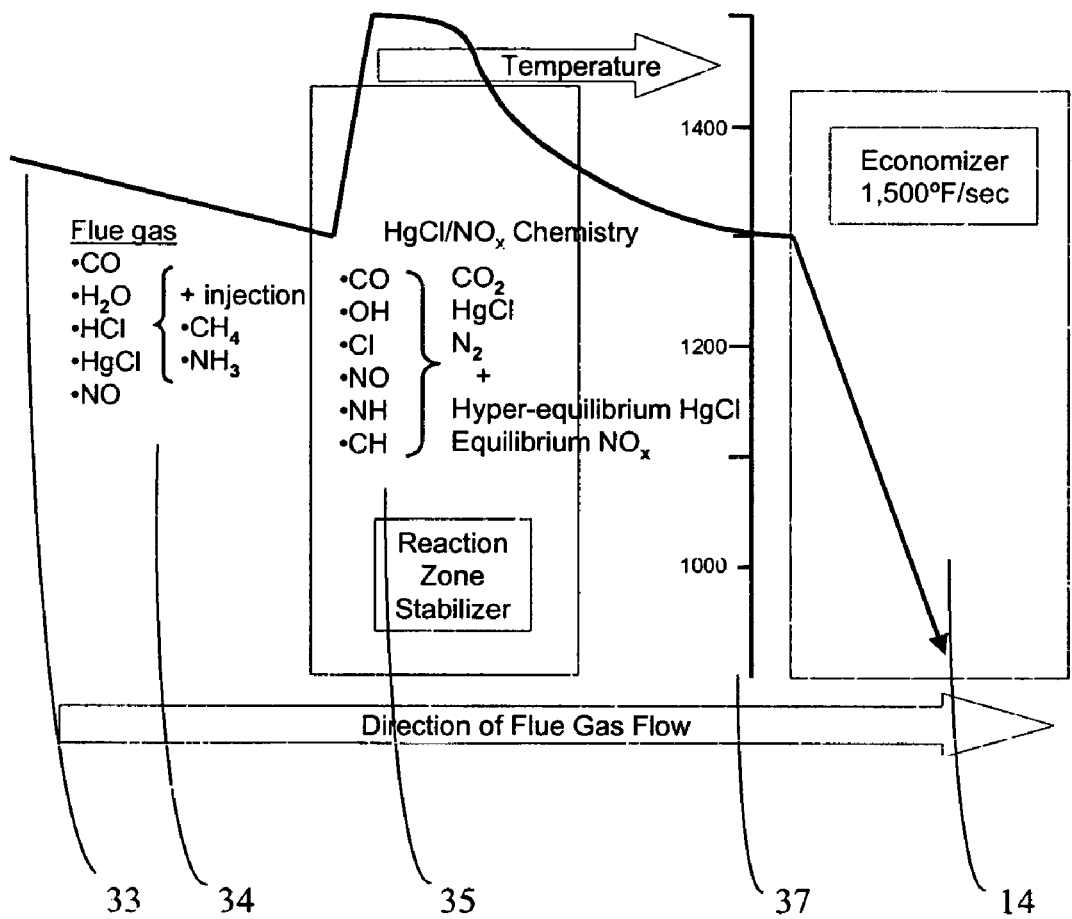
FIG. 11 is a diagram illustrating the activity of the flue gas and the additives as they pass through the reaction zone stabilizer.

FIG. 11 illustrates the operation of the reaction zone stabilizer 35. As indicated in the drawing, the flue gas contains carbon monoxide, water, hydrogen, chloride, mercury chloride and nitrogen oxide as it enters the injection zone 34. The flue gas temperature is shown by line 33 relative to the temperature scale 37. In zone 34 a uniform mixture of fuel (consisting of $CH_4$ and $NH_3$, in this case) has been added to the flue gas in a quantity large enough to increase the temperature of the flue gas by 200° F. This same heat raises the reaction zone stabilizer 200° F. and thus provides a stable continuous ignition front (as the flue gas enters the reaction zone stabilizer). Within the reaction zone stabilizer CO, OH, Cl, NO, NH and CH present in the flue gas react to form $CO_2$, $H_2O$, $HgCl_2$ and $N_2$, with $NO_x$ reduced to the very low equilibrium values of $NO_x$ associated with low flue gas temperatures. The ignition front would not be there except for the heat carried back through the flame-holding material and its conductive and reactive characteristics. In many respects our device is similar to an ordinary flame holding device, used in burners. But, when placed in the flue gas stream, the reaction zone stabilizer raises the flue gas temperature to almost the same temperature as when started. At this point, NO reacts with CH and NH to equilibrate at temperatures in this selected range of 1450° F. to 900° F. Its resulting equilibrium value is practically zero or less than 5 ppm given non-uniformities of injection and other variables. Also, the CO equilibrates to practically zero in the same chemistry created by this reaction zone stabilizer. Just as importantly the hyper-equilibrium oxidation of mercury occurs in this same temperature range and is optimized by these same chemical reactions which maximize the Cl free radical by reaction with HCl.

The amount of HgCl can be optimized by uniform mixing of chemical species known to increase HgCl concentration, followed by a reaction zone stabilized by a ceramic, metal or catalytic reaction stabilization device (similar to a flame-holding device used in catalytic combustion). This reaction stabilization device can be placed at a temperature in the range of 1,450° F. to 900° F. where it is known that HgCl forms while NO and CO are both driven toward very low equilibrium concentrations. This reaction stabilization device provides conduction of heat back into an initial reaction front. In this manner, the high temperature generated by chemical reaction at the front is available to continually initiate chemical reaction of the incoming flue gas mixture.

Before this stabilized reaction zone, a mixture of gaseous fuel (such as natural gas) and other chemicals may be added to previously generated CO and nitrogenous species emanating from previous fuel-lean reburn and/or SNCR $NO_x$ reduction processes. Thus, an exothermic reaction will be initiated in the stabilized reaction zone that has the purpose of enhancing the $NO_x$ equilibrium and creating reactive radicals (such as OH) which increase the free-radical Cl concentration. Small amounts of combustible reagents and additives provide radical species which are kinetically active in providing not only the path for NO reduction to $N_2$, but also active in providing for the generation of Cl radicals which cause hyper-equilibrated mercury chloride to form. The stabilized reaction zone has the added feature of controllability, so that temperature and injected reagents can be adjusted to minimize unreacted CO and ammonia slip emissions while maximizing oxidation of mercury vapor to mercury chloride.

Very little fuel needs be injected to cause this self-sustaining front created by the reaction zone stabilizer. A maximum of 2% to 5% of the total fuel would allow heat to be lost at the same rate that it is conducted back to the front, while as little as 0.1% would allow this front to exist in an essentially adiabatic situation, with the flame-holding device recovering and conducting all of the generated heat back to its temperature source.

The equilibration of NO and CO and the hyper-equilibration of HgCl may be simultaneously optimized at different temperatures within the 1,450° F. to 900° F. range, dependent on gas concentrations and moisture. This flue gas is rapidly cooled as it passes through the economizer 16. The preferred cooling rate is at least 1,000° F./second, and preferably is 1,500° F./second or greater, as noted in FIG. 11. A similar process will occur with other metals present in the flue gas. Desired catalysts could be placed in the reaction zone stabilizer to facilitate reaction of metals in the flue gas to form compounds that will be removed by the baghouse.

While the present invention has been described with particular reference to the drawings, it should be understood that the invention is not limited to the preferred embodiments here disclosed but may be variously embodied within the scope of the following claims.

We claim:

1. A method of removing mercury from flue gas produced by combustion devices burning mercury containing fuel, the flue gas containing particles and passing from a combustion zone in which the temperature exceeds 2600° F., through a first temperature zone in which the temperatures range from 1750° F. to 2100° F., through a second temperature zone in which the temperatures range from 900° F. to 1450° F. and through a particle removal device, the method comprising:
   introducing ammonia into the flue gas when the flue gas passes through the second temperature zone, the ammonia being introduced in sufficient amounts to oxidize mercury within the flue gas;
   thereafter passing the flue gas through a reaction zone stabilizer, the reaction zone stabilizer positioned within the furnace at a location where the flue gas has passed the at least one injector and the flue gas is at a temperature in the range of from 900° F. to 1450° F.;
   thereafter rapidly cooling the flue gas after the ammonia has been introduced into the flue gas from a temperature within the range of 1,450° F. to 900° F. to a temperature below 900° F. at a rate of at least 1000° F. per second to minimize decomposition of mercury chloride in the flue gas;
   directing the flue gas to the particle removal device; and
   monitoring the flue gas after the flue has passed through the particle removal device to determine whether mercury vapor is present within a desired range and thereby confirm that ammonia has been introduced in sufficient amounts to oxidize mercury within the flue gas.

2. The method of claim 1 also comprising adding carbon monoxide to the flue gas.

3. The method of claim 2 in which the ammonia is introduced and the carbon monoxide is added by injecting urea into the flue gas such that ammonia and carbon monoxide are formed from the urea, wherein the urea is added to the flue gas stream at the second temperature zone.

4. The method of claim 2 wherein the fuel is burned in a burner to produce initial flames and the carbon monoxide is added to the flue gas by adjusting air to fuel ratio in the initial flames in a manner to produce sufficient carbon monoxide so that enough carbon monoxide will be in the flue gas when the flue gas passes through the second temperature zone to oxidize mercury present in the flue gas.

5. The method of claim 2 wherein the fuel is burned in a burner and the carbon monoxide is added to the flue gas by careful control of the size consistency of the fuel fired in the furnace to produce sufficient carbon monoxide so that enough carbon monoxide will be in the flue gas when the flue gas passes through the second temperature zone to oxidize mercury present in the flue gas.

6. The method of claim 2 wherein the fuel is burned in a burner and the carbon monoxide is added to the flue gas by biased firing of the burners to produce sufficient carbon monoxide so that enough carbon monoxide will be in the flue gas when the flue gas passes through the second temperature zone to oxidize mercury present in the flue gas.

7. The method of claim 1 wherein the ammonia is added to the flue gas prior to passage of the gas through the second temperature zone.

8. The method of claim 1 also comprising taking a sample of the flue gas from the second temperature zone and measuring an amount of carbon monoxide present in the flue gas.

9. The method of claim 1 also comprising injecting a gaseous or gas producing hydrocarbon fuel into the flue gas before the flue gas enters the second temperature zone.

10. The method of claim 1 wherein the flue gas is rapidly cooled to a temperature below 650° F. to minimize decomposition of mercury chloride in the flue gas.

11. The method of claim 1 wherein the flue gas is rapidly cooled at a rate of at least 1500° F. per second.

12. A method of removing metals from flue gas produced by combustion devices burning fuel containing those metals, the flue gas containing particles and passing from a combustion zone in which the temperature exceeds 2600° F., through a first temperature zone in which the temperatures range from 1750° F. to 2100° F., through a second temperature zone in which the temperatures range from 900° F. to 1,450° F. and through a particle removal device, the method comprising:
   introducing a material into the flue gas that controls free radical Cl when the flue gas passes through the second temperature zone in sufficient amounts to oxidize the metals within the flue gas;
   thereafter passing the flue gas through a reaction zone stabilizer, the reaction zone stabilizer positioned within the furnace at a location where the flue gas has received the introduced material and the flue gas is at a temperature in the range of from 900° F. to 1450° F.;
   directing the flue gas to the particle removal device; and
   monitoring the flue gas after the flue has passed through the particle removal device to determine whether the metals are present within a desired range and thereby confirm that the material has been introduced in sufficient amounts to oxidize the metals within the flue gas.

13. The method of claim 12 wherein the material is a material selected from the group consisting of ammonia, urea, hydrochloric acid and carbon monoxide.

14. The method of claim 12 wherein the metals are selected from the group consisting of chromium, arsenic, selenium, cadmium, mercury, and lead.

15. The method of claim 12 also comprising rapidly cooling the flue gas after the ammonia has been introduced into the flue gas from a temperature within the range of 1,450° F. to 900° F. to a temperature below 650° F. to minimize decomposition of mercury chloride in the flue gas.

16. The method of claim 12 also comprising cooling the flue gas after the ammonia has been introduced into the flue gas at a rate of at least 1000° F. per second from a temperature within the range of 1450° F. to 900° F. to a temperature below 650° F.

17. A method of removing metals from flue gas produced by combustion devices burning fuel containing metals, the flue gas containing particles and passing from a combustion zone in which the temperature exceeds 2600° F., through a first temperature zone in which the temperature ranges from 1750° F. to 2100° F., through a second temperature zone in which the temperatures range from 900° F. to 1,450° F. and through a particle removal device, the method comprising:
   introducing a material into the flue gas that affects the flue gas in a manner to optimize Cl oxidation of elemental metals in the second temperature zone;
   thereafter passing the flue gas through a reaction zone stabilizer, the reaction zone stabilizer positioned within the furnace at a location where the flue gas has received the introduced material and the flue gas is at a temperature in the range of from 900° F. to 1450° F.;
   directing the flue gas to the particle removal device; and
   monitoring the flue gas after the flue has passed through the particle removal device to determine whether the elemental metals are present within a desired range and thereby confirm that the material has been introduced in sufficient amounts to optimize Cl oxidation of the elemental metals in the second temperature zone.

18. The method of claim 17 wherein the material is a material selected from the group consisting of ammonia, urea, hydrochloric acid, carbon monoxide and halogen salts.

19. The method of claim 17 wherein the metals removed are from the group consisting of chromium, arsenic, selenium, cadmium, mercury, lead, and all other heavy metals that are environmentally dangerous but susceptible to this active chloride oxidation including uranium, strontium, and molybdenum.

20. The method of claim 17 also comprising rapidly cooling the flue gas after the ammonia has been introduced into the flue gas from a temperature within the range of 1,450° F. to 900° F. to a temperature below 650° F. to minimize decomposition of metal chlorides in the flue gas.

21. The method of claim 17 also comprising cooling the flue gas after ammonia has been introduced into the flue gas at a rate of at least 1000° F. per second from a temperature within the range of 1,450° F. to 900° F. to a temperature below 650° F.

* * * * *